US010819502B2

(12) United States Patent
Maghrebi et al.

(10) Patent No.: US 10,819,502 B2
(45) Date of Patent: Oct. 27, 2020

(54) METHOD FOR SYMMETRIC BLOCK ENCRYPTION OR DECRYPTION

(71) Applicant: Safran Identity & Security, Issy-les-Moulineaux (FR)

(72) Inventors: Houssem Maghrebi, Issy-les-Moulineaux (FR); Guillaume Dabosville, Issy-les-Moulineaux (FR); Emmanuel Prouff, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 113 days.

(21) Appl. No.: 15/716,372

(22) Filed: Sep. 26, 2017

(65) Prior Publication Data

US 2018/0091297 A1 Mar. 29, 2018

(30) Foreign Application Priority Data

Sep. 27, 2016 (FR) ...................... 16 59059

(51) Int. Cl.
*H04L 9/06* (2006.01)
*H04L 9/00* (2006.01)
*H04L 9/14* (2006.01)

(52) U.S. Cl.
CPC ............ *H04L 9/0631* (2013.01); *H04L 9/002* (2013.01); *H04L 9/14* (2013.01)

(58) Field of Classification Search
CPC .......... H04L 9/0631; H04L 9/14; H04L 9/002
(Continued)

(56) References Cited

U.S. PATENT DOCUMENTS 5,168,521 A 12/1992 Delaporte et al.
6,940,975 B1 * 9/2005 Kawamura ............ H04L 9/003
380/29

(Continued)

FOREIGN PATENT DOCUMENTS

EP 2180631 A1 4/2010
EP 2351286 A1 8/2011

OTHER PUBLICATIONS

Key Scheduling in Des Type Cryptosystems Department of Computer Science University College, UNSW, Australian Defence Force Academy Canberra ACT 2600. Australia (Year: 2005).*

(Continued)

*Primary Examiner* — Farid Homayounmehr
*Assistant Examiner* — Sanchit K Sarker
(74) *Attorney, Agent, or Firm* — Womble Bond Dickinson (US) LLP

(57) ABSTRACT

The present invention relates to a method for symmetrical encryption or decryption of a data block from a secret key (K), the method comprising steps of:
  permutation (100) of at least one portion of the secret key (K) by means of a first permutation table (PC1') so as to produce initial data,
  execution of several iterations, an iteration comprising steps of:
    rotation (102) of data dependent on the initial data so as to produce shifted data,
    permutation (104) of the shifted data by means of a second permutation table (PC2') so as to produce a round key,
  execution of a plurality of encryption rounds (200) from the data block, an encryption round (200) using one of the round keys,
  generation of at least one of the permutation tables (PC1', PC2'), the generation comprising
(Continued)

determination of at least one function (F, G) variable from one encryption or decryption to another, composition of said function (F, G) with a predetermined permutation table (PC1, PC2), application of the inverse of said function (F, G) to data dependent on the data produced by the permutation step (100, 104) using the generated permutation table (PC1', PC2').

16 Claims, 7 Drawing Sheets

(58) Field of Classification Search
USPC .......................................................... 380/28
See application file for complete search history.

(56) References Cited

U.S. PATENT DOCUMENTS

| 7,471,791 | B1* | 12/2008 | Coron | ..................... | H04L 9/003 |
| | | | | | 380/259 |
| 2004/0165721 | A1 | 8/2004 | Sano et al. | | |
| 2012/0155638 | A1* | 6/2012 | Farrugia | ............... | H04L 9/0631 |
| | | | | | 380/45 |
| 2013/0010963 | A1* | 1/2013 | Farrugia | ................. | H04L 9/002 |
| | | | | | 380/277 |

OTHER PUBLICATIONS

Wyseur, Brecht, "White-Box Cryptography: Hiding Keys in Software", 2012, pp. 1-9, Available at <http://whiteboxcrypto.com/files/2012_misc.pdf>.

Rechberger et al., "Practical Template Attacks", In Information Security Applications, Lim C. H., Yung M. (Eds), WISA 2004, Lecture Notes in Computer Science, vol. 3325, 2005, pp. 440-456.

Preliminary Research Report and Written Opinion received for French Application No. 1659059, dated May 29, 2017, 4 pages (1 page of French Translation Cover Sheet and 3 page of original document).

European Search Report received for EP Patent Application No. 17192810.4, dated Jan. 23, 2018, 3 pages of Original Document Only.

El Aabid et al., "Template Attacks with a Power Model", International Association for Cryptologic Research, 2007, pp. 1-15.

\* cited by examiner

METHOD FOR SYMMETRIC BLOCK ENCRYPTION OR DECRYPTION

FIELD OF THE INVENTION

The present invention relates to a method for symmetric block encryption/decryption.

PRIOR ART

The DES encryption method ("Data Encryption Standard") is a known method of symmetric block encryption using a secret key. The TDES ("triple DES") encryption method comprising several DES encryption is also known.

DES encryption is executed in several rounds, each round using a round key.

The round keys are generated from the secret key during key schedule, conventionally comprising the following steps conducted by means of two predetermined permutation tables PC1 and PC2:
  permutation, in a first permutation step, of at least one portion of the secret key by means of the table PC1 so as to produce initial data,
  execution of several iterations, one iteration comprising steps of:
    rotation (i.e. a circular shift or bitwise rotation) of data dependent on the initial data so as to produce shifted data,
    permutation, in a second permutation step, of the shifted data by means of the table PC2 so as to produce a round key.

Each round key generated during an iteration is used during a round to encrypt data which depend of an input data block. The tables PC1 and PC2 are constant from one DES encryption to another.

Such a DES encryption method is typically executed by an electronic device such as a smart card.

Such a device may be subject to physical attacks called side-channel attacks. A side-channel attack consists of monitoring the physical behavior of the device (power consumption, electromagnetic radiation, etc . . . ) during execution of an algorithm embedded in the device. The resulting information by such monitoring may be exploited hereinbelow to determine secret data used in encryption or signature calculations.

For example, when such a device runs DES encryption, it is possible to determine the secret key used during this encryption.

In fact, a conventional key schedule is not secure against side-channel attacks. Therefore, to obtain the round keys and finally the secret key from which they came, the attacker has only to exploit a single signal generated by the device (for example a single signal for power consumption). This is possible by applying a particular side-channel attack, called attack by learning (for example "Template attack"). This attack proceeds in two phases: a learning phase during which the attacker determines statistical characteristics for each possible value of the secret key and constructs a dictionary of keys on the basis of these characteristics, and an attack phase during which the attacker observes the signal emitted by the device and tries to recover the secret key by using the dictionary constructed during the learning phase.

The following documents highlight the vulnerabilities of the known key schedules vis-a-vis side-channel attacks:
  "Template Attacks with a Power Model" by M. Abdelaziz Elaabid, Sylvain Guilley, Philippe Hoogvorst (2007),
  "Practical template attacks" by Chae Hoon Lim and Moti Yung (2004).

Document EP2351286A1 proposes for example the following method for countering a side-channel attack, especially an attack by learning. Let A be an encryption algorithm, K be a secret key and M be input data to be encrypted. Two bijections are determined: a function f (for transforming the secret key) and a function g (for transforming the input data), the functions f and g being such that $A(f(K), g(M))$ is a function R of $A(K,M)$, i.e., giving the relation:

$$A(f(K),g(M))=R[A(K,M)]$$

Document EP2351286A1 proposes in particular an embodiment in which A=DES, and f, g, R are functions of complements at 1 (noted ~). The following relation is verified:

$$A(f(K),g(M))=DES(\sim K,\sim M)=\sim DES(K,M)$$

Encryption of data M comprises calculation of $A(K,M)$, calculation of $A(f(K), g(M))$, and verification of the respect of the preceding relation between the two calculated results. If the relation is not properly verified, then an encryption error is detected.

However, the solution proposed in document EP2351286A1 is only overall protection of a data encryption. This solution therefore fails to protect against attacks by learning probing the contents of buffer tampon, storing intermediate calculation data calculated during a key schedule of DES encryption, giving:
  data subject to rotation,
  round keys, resulting from permutation executed on the database subject to rotation.

DESCRIPTION OF THE INVENTION

An aim of the invention is to propose a method for symmetric block encryption/decryption better protected against side-channel attacks, in particular against attacks by learning.

Therefore a method for symmetrical encryption or decryption of a data block from a secret key is proposed, the method comprising the following steps:
  a first permutation step which permutes at least one portion of the secret key by means of a first permutation table so as to produce initial data,
  execution of several iterations, an iteration comprising steps of:
    rotation of data dependent on the initial data so as to produce shifted data,
    a second permutation step which permutes the shifted data by means of a second permutation table so as to produce a round key,
  execution of a plurality of encryption rounds from the data block, an encryption round using one of the round keys,
  generation of at least one of the permutation tables used in the first and second permutation steps, the generation comprising
    determination of at least one function variable from an encryption or decryption to another,
    composition of said function with a predetermined permutation table,
    application of the inverse of said function to data dependent on the data produced by the permutation step wherein the generated permutation table is used.

As one of the permutation tables depends on a function which varies from one encryption/decryption to another, the data which result from permutation executed by means of this generated table also vary from one encryption/decryption to another. This makes it more difficult for an attacker undertaking a side-channel attack of learning type to guess the secret key or one of the round keys by probing such data.

Application of the inverse of the function performed on data which depend on data produced by means of the generated table (which is variable) generate data adapted to the subsequent steps of the encryption method, without these subsequent steps having to be modified.

The method may in particular comprise steps of:
generation of the permutation table intended to be used during permutation of at least one portion of the secret key, the generation comprising
determination of a function variable from one encryption/decryption to another,
composition of the function with a predetermined permutation table,
generation of at least one permutation table intended to be used during the permutation step of an iteration, the generation comprising composition of the inverse of the function with a predetermined permutation table.

Here it is ensured that the permutation table used to permute the portion of the secret key is made variable from one execution to another of the encryption method; the initial data intended to be subject to rotations are consequently protected.

The method may further comprise steps of:
generation of at least one permutation table intended to be used during an iteration, the generation comprising:
generation of a function variable from one encryption/decryption to another,
composition of the function with a predetermined permutation table,
application of the inverse of the function to data dependent on the round key produced during the iteration.

Here it is ensured that at least one of the permutation tables (used during one of the iterations) is made variable from one execution to another of the encryption/decryption method; the round key obtained by means of this permutation table on completion of the corresponding iteration is consequently protected.

Application of the inverse of the second function may be performed at a more or less late stage in the encryption method.

For example, if the encryption method comprises a protective processing modifying a round key into a modified round key before its use in an encryption round, the inverse of the second function may then be applied to the modified round key.

Alternatively, the method may comprise generation of an expansion table, said generation comprising composition of a predetermined expansion table with the function, and wherein an encryption round comprises an expansion step of data dependent on the data block by means of the generated expansion table so as to produce expanded data, and a calculation step of the exclusive disjunction of the expanded data and of one of the round keys: the inverse of the second function is applied to the result of the calculation of calculated exclusive disjunction. According to this alternative, application of the inverse of the second function is here conducted within an encryption round.

The method may also be completed by way of other optional characteristics listed hereinbelow, taken singly or in combination when this is technically possible.

The method may comprise generation of at least one substitution table, said generation comprising composition of the inverse of the function with a predetermined substitution table, and wherein an encryption round further comprises a step of substitution of the result of the calculation of exclusive disjunction by means of the generated substitution table.

Several permutation tables may be generated by means of different functions, and be used during different respective iterations.

The generated permutation table may be bijective, and an iteration which follows the iteration using the bijective permutation table may comprise:
inverse permutation of the round key produced during the reference iteration so as to produce the data dependent on the initial data to which the rotation is applied, the inverse permutation being executed by means of an inverse table of the generated permutation table,
after the rotation step, execution of the permutation step by means of the bijective permutation table so as to produce a new round key.

The bijective permutation table may be configured to permute an input datum into an output datum by:
application of an injective permutation table to some bits of the datum so as to produce an intermediate datum whereof the number of bits is less than the number of bits of the input datum,
concatenation of the intermediate datum with the other bits of the input datum not used by the injective permutation table so as to produce the output datum.

The method may also comprise generation of at least one shift value indicating a number of bits, the value being variable from one encryption or decryption to another, at least one iteration comprising rotation of the result of the permutation of the shifted data according to the shift value in generated bits so as to produce the round key.

Several shift values in a number of bits may be generated, the values being used during different respective iterations.

The shift values in a number of bits may be generated from a same number drawn randomly.

A permutation table used during a permutation step may be selected from several different generated permutation tables. This selection may be random.

A permutation table intended to be used during an iteration may be selected as a function of an shift value used during the rotation step of the iteration, the shift value in turn being particular to the iteration.

A variable function may consist of a plurality of sub-functions composed with different portions of the predetermined permutation table.

According to a second aspect of the invention, a computer program product is also proposed comprising program code instructions for execution of the steps of the preceding method, when this program is executed by at least one processor.

According to a third aspect of the invention, a device for symmetrical encryption or decryption of a data block from a secret key is also proposed, the device comprising:
at least one memory for storing at least one predetermined permutation table,
at least one processor configured to
permute in a first permutation step at least one portion of the secret key by means of a permutation table so as to produce initial data,
perform several iterations, an iteration comprising steps of:
rotation of data dependent on the initial data so as to produce shifted data, permutation in a second permutation step of the shifted data by means of a permutation table so as to produce a round key, performing a plurality of encryption rounds from the data block, an encryption round using one of the round keys, generating at least one of the permutation tables used in the first and second permutation steps, the generation comprising determination of at least one function variable from one encryption or decryption to another, and composition of said function with a stored predetermined permutation table, and for applying the inverse of said function to data dependent on the data produced by the permutation step wherein the generated permutation table is used.

DESCRIPTION OF THE FIGURES

Other characteristics, aims and advantages of the invention will emerge from the following description which is purely illustrative and non-limiting and which must be considered with respect to the appended drawings, wherein.

In all figures, similar elements bear identical reference numerals.

DETAILED DESCRIPTION OF THE INVENTION

Figure 1:
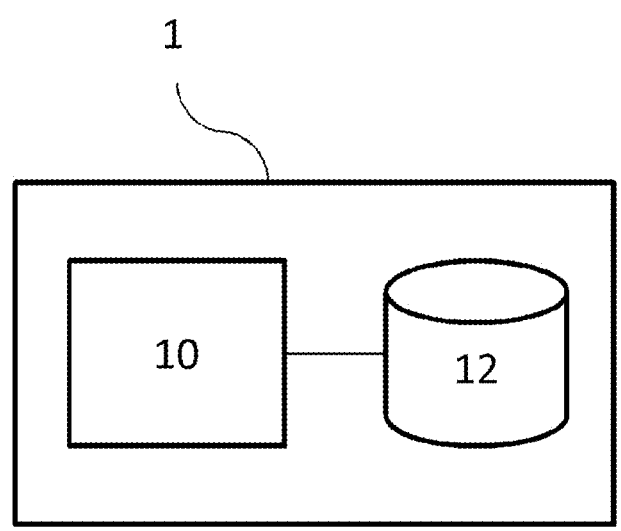
FIG. 1 schematically illustrates a device for symmetric block encryption/decryption.

In reference to FIG. 1, an encryption/decryption device 1 comprises at least one processor 10 and at least one memory 12.

The processor 10 is configured to execute a symmetric block encryption program, for example DES, TDES or AES encryption/decryption. The non-limiting example of DES encryption/decryption will be taken hereinbelow.

The memory 12 is configured to store data used by this program.

In particular, the memory 12 comprises a non-volatile memory unit which stores the following data:

at least two permutation tables PC1 and PC2,
at least one expansion table,
and at least one substitution table, for example 8 substitution tables S1 to S8 (these tables are commonly called "S-Box" in the literature).

The non-volatile memory unit is of HDD, SSD, Flash type, etc.

The memory 12 also comprises a volatile memory unit (for example of RAM type). The purpose of the volatile memory unit is to temporarily store data generated by the processor 10.

First Embodiment

Figure 2:
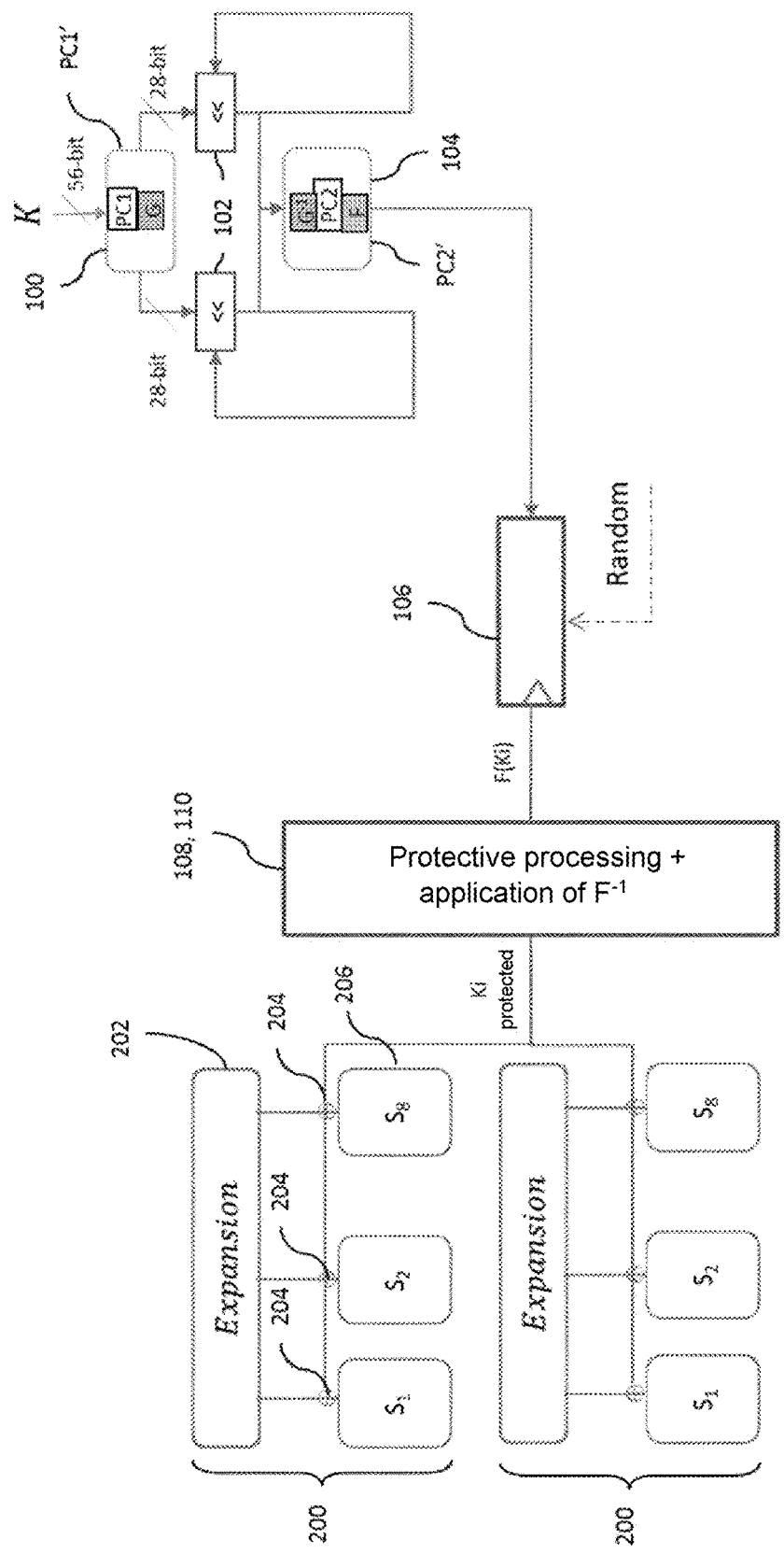
FIGS. 2 to 7 illustrate some steps of six encryption or decryption methods, respectively according to a first, second, third, fourth, fifth and sixth embodiment of the invention.

In reference to FIG. 2, a symmetric block encryption method according to a first embodiment comprises the following steps.

The encryption method inputs a data block to be encrypted and a secret key K.

The encryption method comprises a key schedule method generating a plurality of round keys from the secret key K.

The key schedule method comprises the following steps.

The processor 10 generates a first permutation table PC1'. This generation comprises determination of a function G, which is variable from one DES encryption to another, and the composition of the function G with the permutation table PC1 stored in the memory.

The function G is for example a permutation function determined randomly.

The processor 10 also generates a second permutation table PC2'. This generation comprises: determination of a function F, which is also variable from one DES encryption to another, and composition of the function F with the permutation table PC2 stored in the memory. The inverse of the function G is also composed with the permutation table PC2. This eventually gives:

$$PC1'=G \cdot PC1$$

$$PC2'=F \cdot PC2 \cdot G^{-1}$$

The functions F and G are preferably different.

In a step 100, the processor 10 executes permutation on at least one portion of the secret key K, and this by means of the first permutation table PC1'.

The secret key K has typically 64 bits comprising 56 base bits contributing entropy to the secret key K and 8 additional redundancy bits not contributing entropy to the secret key K. The portion of the key K subject to the permutation 100 is formed by the 56 base bits, and permutation 100 produces initial data having a cumulative length of 56 bits also.

The function G occurring in permutation 100 is for example a randomly determined permutation function.

The function G may also comprise two sub-functions (G1, G2) each operating on 28 bits (for example, G1 will permute the 28 bits of heavy weight and G2 will permute the 28 bits of low weight). The sub-functions are for example drawn randomly.

The result of permutation 100 is split into two initial data: the 28 bits of heavy weight of this result and the 28 bits of low weight of this result.

The method then executes a plurality of iterations, each iteration producing a round key.

The first iteration comprises the following steps.

In a step 102, the processor 10 performs rotation (i.e. a circular shift or bitwise rotation) of each of the two initial data so as to produce two data shifted by a certain number of bits (for example rotation to the left).

In a step 104, the processor 10 permutes the shifted data by means of the table PC2' so as to produce a first round key. More precisely, permutation 104 is executed on the concatenation of the two shifted data.

In this respect, the function F may operate on all the bits of the data resulting from application of the table PC2 (these data generally having 48 bits).

Alternatively, the function F may comprise a plurality of sub-functions each operating from the different portions of the data resulting from application of the table PC2. For example, the function F comprises 8 sub-functions each operating on 6 bits of these data.

The first round key produced is temporarily stored 106 in a registry of the memory.

In a step 108, the processor 10 performs at least one protective processing modifying the first round key in a first intermediate round key. The protective processing comprises for example masking and/or shifting steps, known per se.

An inverse function of the second function F is applied 110 to the first intermediate round key, so as to obtain a first protected round key K1.

The following iterations comprise the same steps 102, 104, 106, 108, 110, so as to generate round keys K2, K3, etc.

The rotation step 102 of a given iteration is applied to the data shifted during the iteration preceding the given iteration.

In this embodiment, one and the same table PC2' is used during the permutation step 104 of each iteration. The same function F is therefore implicitly used during each iteration, since the table PC2' depends on this function F.

The encryption method also comprises a plurality of encryption rounds 200 of the input data block, each encryption round 200 using one of the round keys generated during the key schedule.

The steps of each encryption round are known per se, though it should be remembered that an encryption round conventionally comprises at least the following sub-steps:
- expansion 202, by means of a expansion table stored in the memory 12, of data which depend on the data block so as to produce expanded data,
- calculation 204 of the exclusive disjunction of the expanded data and a round key (this operation generally being called «XOR» in the literature, and identified by means of the symbol "⊕" in the appended figures),
- substitution 206 of the result of the exclusive disjunction calculation, by means of a substitution table stored in the memory 12.

In unconventional terms, the round key used during the exclusive disjunction calculation is the first protected round key K1.

There are 16 encryption rounds and iterations of the key schedule for example, each round using a round key specific to it.

In this first embodiment, the steps of an encryption round are not modified relative to the conventional DES encryption methods. The additional permutation tables generated (PC1' and PC2') relative to conventional methods modify only the key schedule part of the DES encryption method. In this way, protection of the key schedule is ensured by way of an additional calculation charge and limited additional memory consumption.

Optionally, the registry of the memory is updated with a value determined randomly between two successive rounds of encryption. This is what ensures that the content of the registry does not pass directly from a round key value to the following round key value, such a transition in fact able to be exploited by an attacker to guess the values of the round keys and consequently that of the secret key K.

Since the DES encryption is symmetrical, a data block is decrypted by means of the same secret key K and the same steps as for the DES encryption method described in relation to FIG. 2.

Second Embodiment

Figure 3:
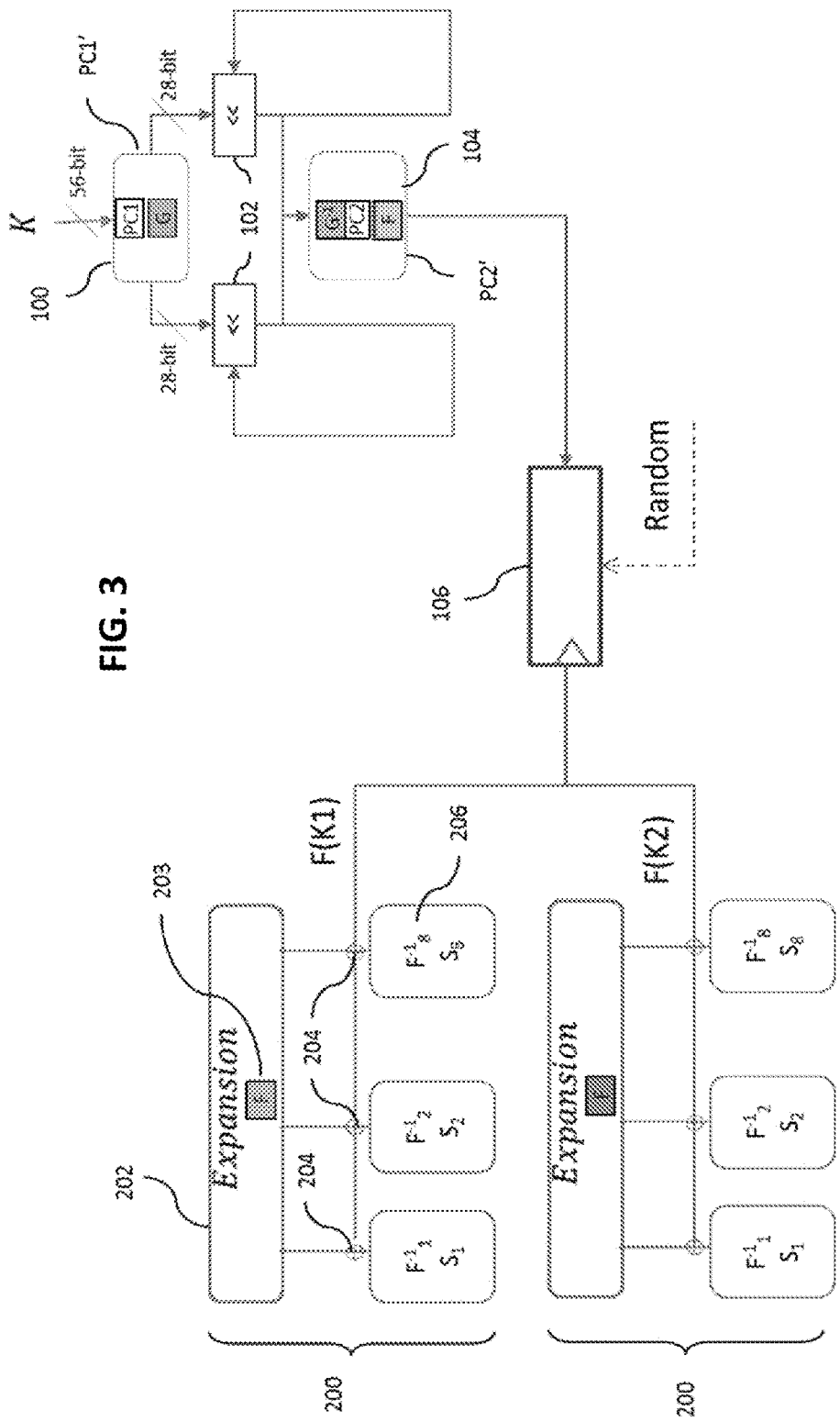

FIG. 3 illustrates a second embodiment of the encryption method, different to the first embodiment by the following features.

The expansion table stored in the memory is not directly used during the expansion step 202. The processor 10 rather generates a second expansion table by composing the expansion table stored with the function F; it is this second expansion table which is used during the expansion step 202. This in fact applies the function F to the expanded data which would result from application of the stored expansion table (as is proposed in the first embodiment).

Also, the inverse of the function F is not applied to the first round key or to an intermediate round key resulting from protective processing of the first round key.

The calculation 204 of the exclusive disjunction inputs the first round key (resulting from the permutation calculation 104 using the table PC2').

Also, the inverse of the function F in this second embodiment is applied during the step 206 to the result of the exclusive disjunction calculated during the step 204.

More precisely, the processor 10 generates a second substitution table by composing the substitution table stored with the inverse function of the function F; it is this second substitution table which is used during the substitution step 206.

The steps 202, 204, 206 are repeated for each encryption round 200.

This second embodiment requires generation of the expansion and substitution tables used during the steps 202 and 206 of an encryption round. But the advantage of this second embodiment is to ensure overall protection of the round keys (both during their generation by the schedule algorithm and when handled during execution of the DES encryption rounds.

Third Embodiment

Figure 4:
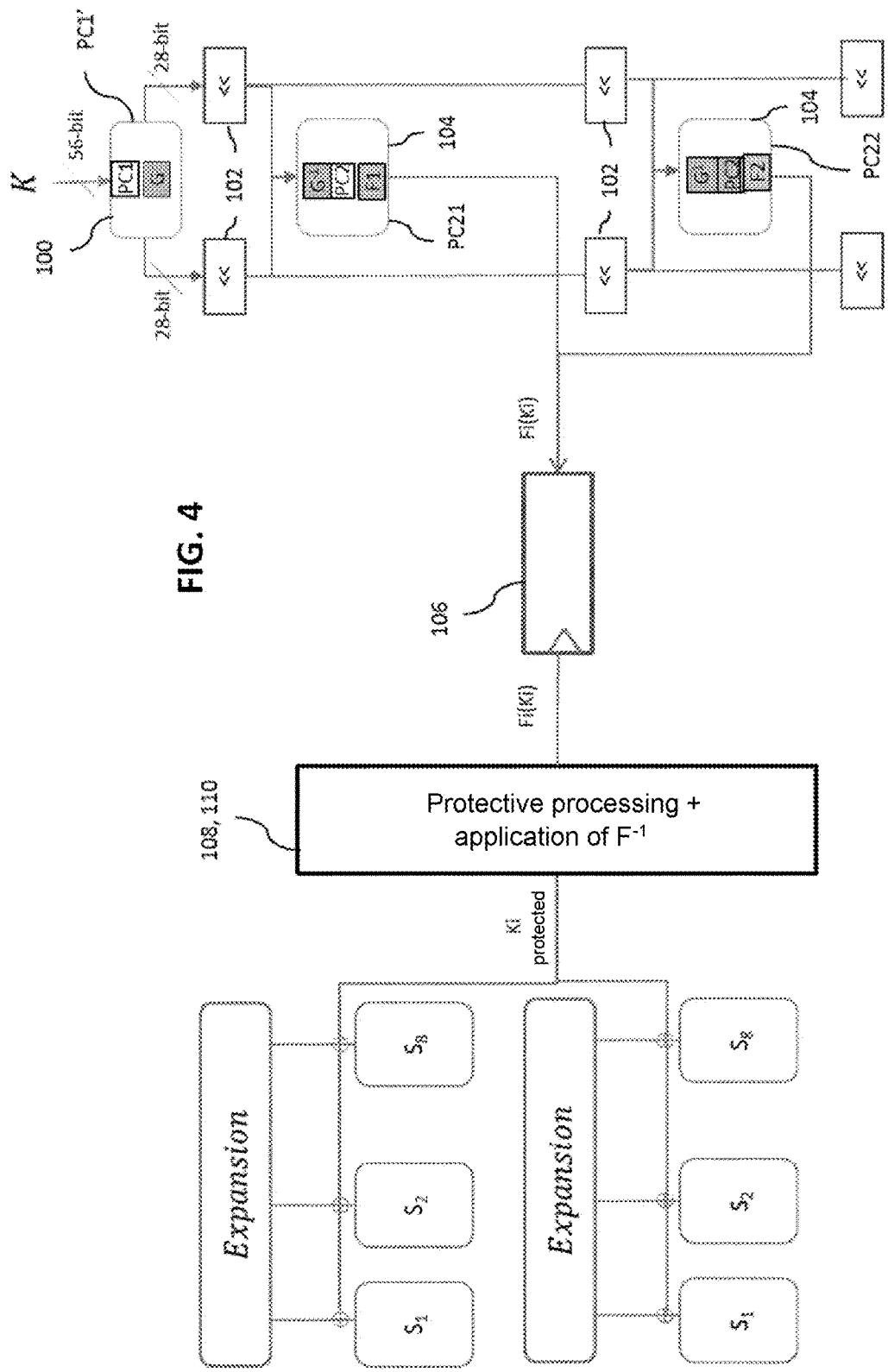

FIG. 4 illustrates a third embodiment of the encryption method, different to the first embodiment by the following features.

Several second permutation tables PC21, PC22, . . . are generated by means of different second functions F1, F2, . . . .

These second tables are used during different iterations, rather than generating a single second permutation table PC2' reused in each iteration of the key schedule.

For example, as many second permutation tables are generated as there are iterations (for example 16 tables if there are 16 round keys to be generated).

Comparatively to the first embodiment, this third embodiment requires generation of more permutation tables, but its advantage is to completely decorrelate the generated round keys.

Fourth Embodiment

Figure 5:
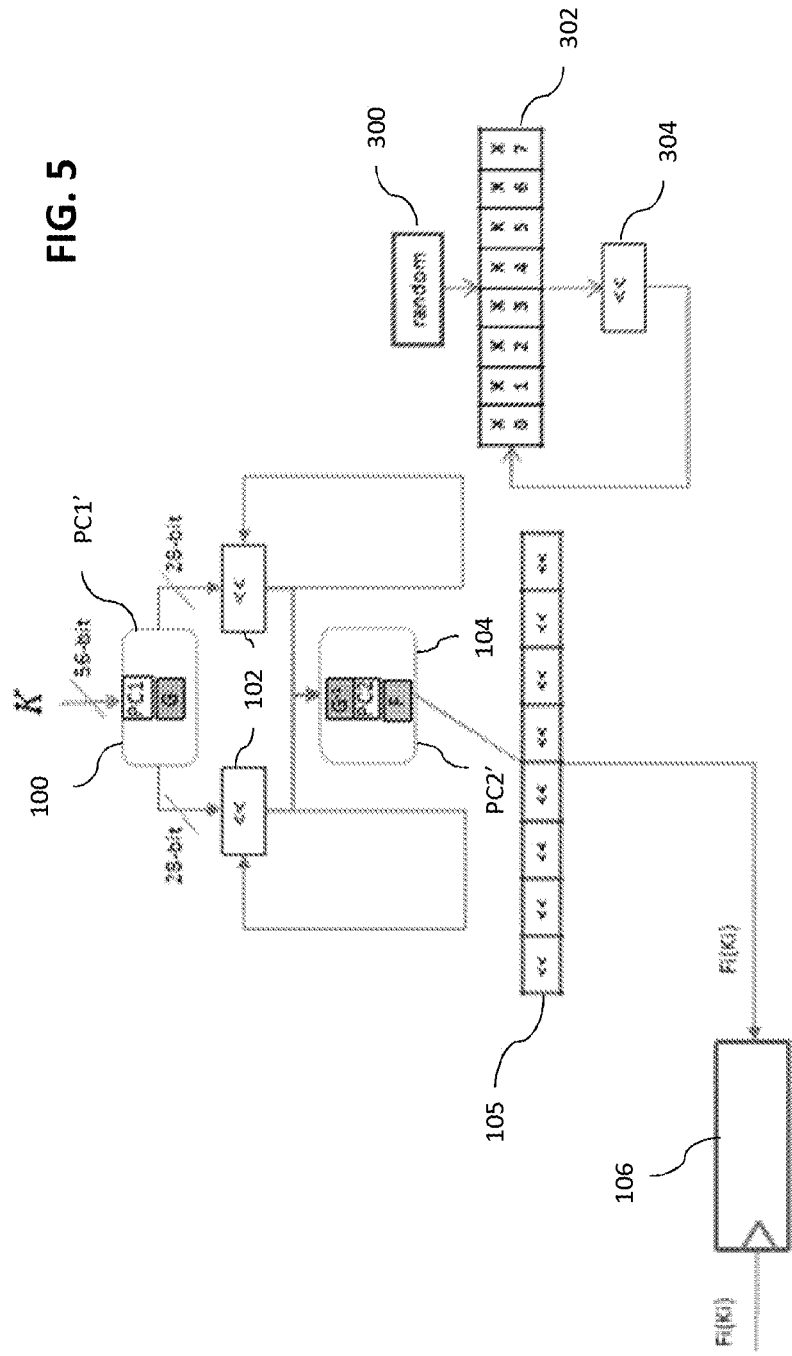

FIG. 5 illustrates the key schedule part of a fourth embodiment of the encryption method, different to the first embodiment by the following features.

The processor 10 generates at least one shift value indicating a number of bits, the value being variable from one encryption to another.

Several shift values may be generated from the same number drawn randomly, the shift values being used during different respective iterations.

For example, the processor 10 generates as many shift values as there are iterations.

Iteration of the key schedule further comprises a rotation step 105 of the result of the permutation 104 of the shifted data, based on the generated shift value. In other words, this extra rotation 105 shifts the bits of the result of step 104 by to the number of (variable) bits indicated by the shift value. The first round key results from this extra rotation 105.

Generation of the shift values in bits may be performed via the following steps.

The processor 10 employs 300 a "random( )" function returning a random number having several bits, for example 8 bits as illustrated in FIG. 5.

The processor 10 stores 302 the returned number as shift value for the first iteration.

The processor 10 executes a rotation 304 of the returned number.

The processor 10 stores 302 the number resulting from this rotation as shift value for the second iteration, and repeats steps 304 and 302 as many times as necessary to generate all the shift values for all other iterations.

Eventually, the shift values are generated from a single randomly drawn number, which gives only a single drawing (for example by calling the "random( )" function). Drawing may be relatively slow to execute; consequently, the fact of operating just a single drawing does not significantly prolong the execution duration of the encryption method.

Fifth Embodiment

Figure 6:
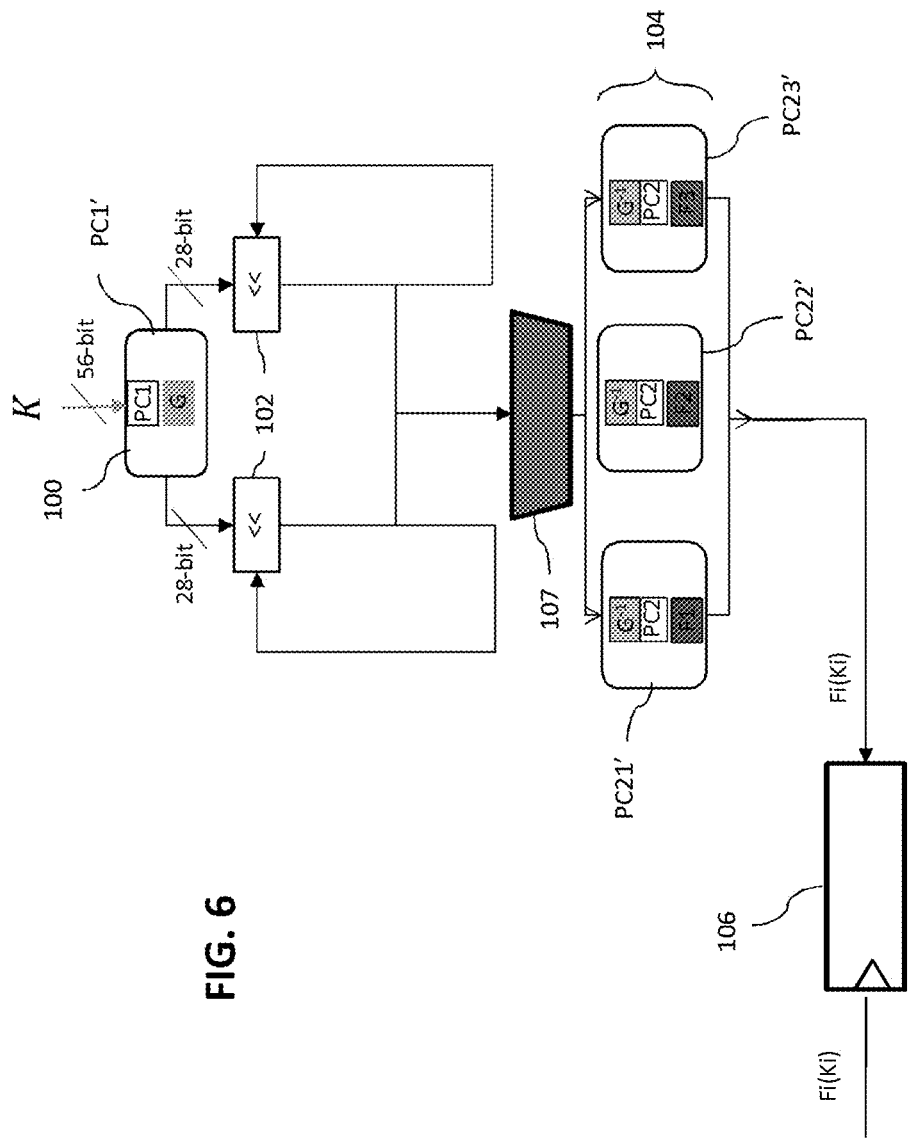

FIG. 6 illustrates a fifth embodiment of the encryption method, different to the first embodiment by the following features.

The processor 10 generates not a single second permutation table PC2', but several different permutation tables (therefore on the basis of different functions F). For example, as is illustrated in FIG. 6, the processor 10 generates three permutation tables PC12', PC22', PC23', dependent respectively on the previously determined functions F1, F2, F3 and specific to them.

The permutation table used during a given iteration is previously selected 107 by the processor 10 from the tables which have been generated.

For each iteration, the processor 10 selects 107 one of the three tables generated.

This selection 107 is preferably random and/or executed before the encryption rounds and/or before the key schedule.

This embodiment presents an increased level of security relative to the first embodiment.

Sixth Embodiment

Figure 7:
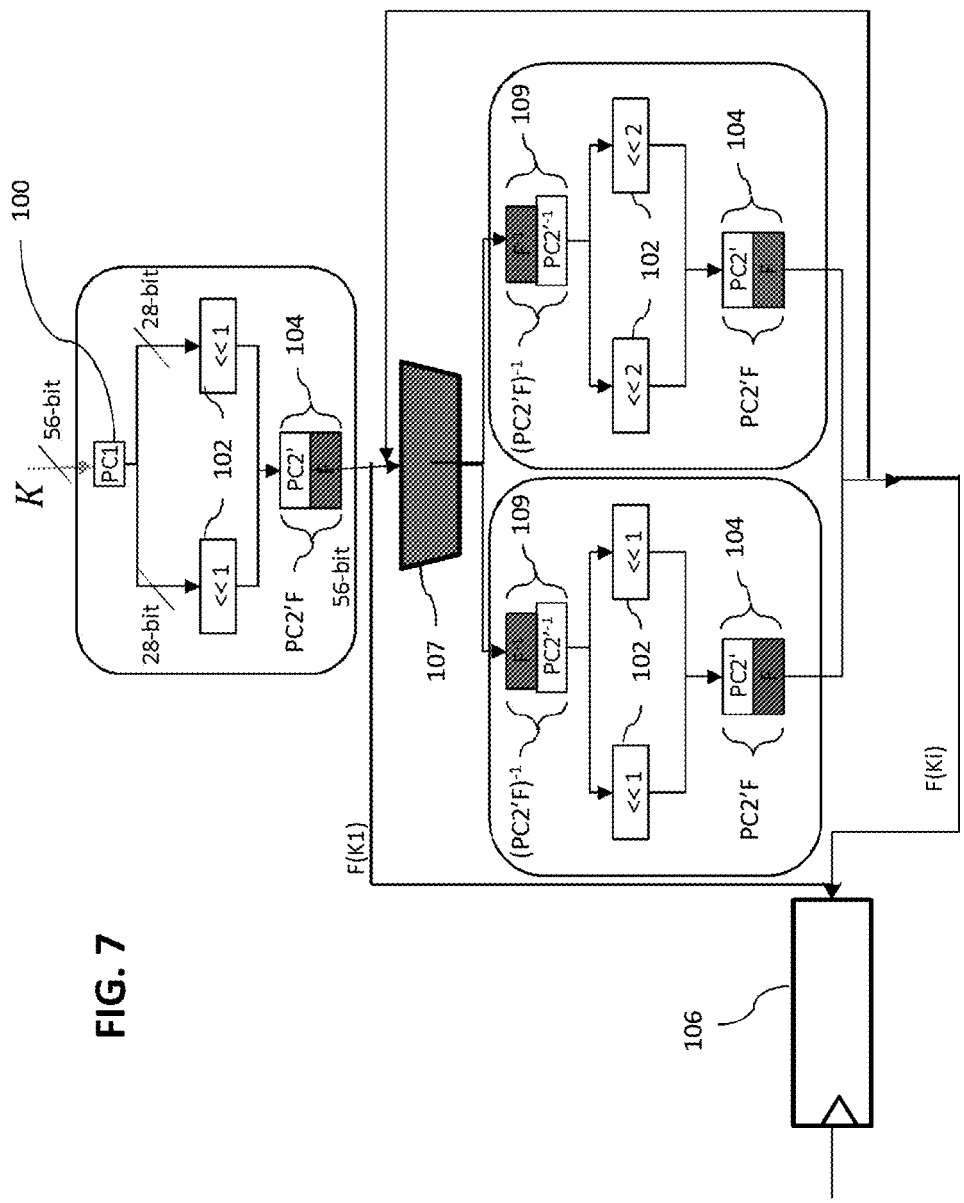

FIG. 7 illustrates a sixth embodiment of the encryption method, different to the first embodiment by the following features.

First, only one function variable from one encryption to another is used (for example the function F).

The permutation 100 is performed on the basis of the predetermined permutation table PC1, which is constant from one encryption/decryption to another.

The table PC2' is also bijective (i.e., from an input datum having q bits, produces an output datum comprising the same number of q bits), which is contrary to the usual practice for implementing a DES encryption.

The permutation table PC2' is configured to permute such an input datum into an output datum as follows:
  applying the (predetermined) injective permutation table PC2 to some bits of the datum having k bits so as to produce an intermediate datum whereof the number of bits is strictly less than k,
  concatenating the intermediate datum with the other bits of the input datum, i.e., the bits not used by the injective permutation table PC2 so as to produce the output datum.

For example, the result of the application of the table PC2' may be:

PC2(x)∥x[9]∥x[18]∥x[22]∥x[25]∥x[35]∥x[38]∥x[43]∥x[54]

where x designates the input datum, coded on 56 bits, and x[i] designates the ith bit of the datum x.

The bijective permutation table PC2' is composed with the function F in another permutation table, also bijective, noted below "PC2'F".

The table PC2' F is expressed as:

PC2'F=F·PC2'

Also, when an iteration is not the first iteration it comprises an additional preliminary step of inverse permutation 109.

Before the rotation step 102, the inverse permutation 109 is applied to the round key produced during the preceding iteration, and this by means of an inverse table of the table PC2'F. The inverse table is expressed:

$(PC2'F)^{-1}=(PC2')^{-1} \cdot F^{-1}$

The data resulting from this inverse permutation 109 then form the object of the rotation 102. This constitutes a difference with the other embodiments previously described, wherein the data to which the rotation step 102 of an iteration not being the first iteration are applied, are the data shifted by the rotation step 102 of the preceding iteration. In these other embodiments, it was consequently necessary to provide three different registries: a first registry for storing the generated round key, and two other registries for storing the shifted data. In the sixth embodiment, these two other registries are no longer needed, effectively reducing the memory consumption of the method.

The rotation step 102 also uses an shift value, for example determined in step 107, as in the fourth embodiment.

The permutation step 104 is then conducted on the basis of the shifted data produced by the rotation step, and this by way of the bijective table PC2'F, so as to generate a round key.

The inverse function of the second function F is then applied to data which depend on the round key (either after application of the protective processing 108, as in the first embodiment, or within an encryption round, as in the second embodiment).

In a particular implementation of this sixth embodiment, it is possible to pre-calculate the following three tables:
  a first table resulting from composition, in this order, of PC1, a table representative of a rotation on 1 bit, then of the table PC2'F: this table generates the first round key which will be protected by the linear function F randomly generated at the start of encryption.
  a second table resulting from composition, in this order, of $(PC2'F)^{-1}$, a table representative of a rotation on 1 bit, then of the table PC2'F: this table generates the round keys for which the shift value in number of bits is 1. These round keys will be protected by the linear function F.
  a third table resulting from composition, in this order, of $(PC2'F)^{-1}$, a table representative of a rotation on 2 bits, then of the table PC2'F: this table generates the round keys for which the shift value in number of bits is 2. These round keys will be protected by the linear function F.

In FIG. 7, these elementary processing events executed by the three tables are identified by three round-cornered frames.

During execution of the key schedule algorithm, the second table or the third table is selected, according to the number of the round.

Features of the third, the fourth and/or the fifth embodiment may be applied to improve the robustness/efficacy of the sixth embodiment, for example:
  generation of different permutation tables for different iterations of the key schedule;
  addition of additional rotation at output from a permutation 104;
  generation of several tables such as the second table or the third table and the selection randomly, from one round to another, of a table to be executed from these tables.

The different embodiments described hereinabove apply to other types of symmetric block encryption based on a secret key, for example TDES or AES.

The invention claimed is:

1. A method comprising:
in a first run, running a process which encrypts or decrypts a data block from a secret key (K), wherein the process comprises
permuting at least one portion of the secret key by means of a first permutation table so as to produce initial data,
selecting a second permutation table (PC2'), wherein the second permutation table (PC2') is generated by composing a function (F) with a predetermined permutation table (PC2), wherein the second permutation table (PC2') differs from said predetermined permutation table (PC2) as a result of said composing the function (F),
executing a plurality of iterations, wherein an iteration comprises:
rotating data dependent on the initial data so as to produce shifted data,
permuting, in a second permutation step, the shifted data by means of the second permutation table so as to produce a round key,
executing a plurality of encryption rounds from the data block, wherein an encryption round uses the round key,
applying an inverse of said function to data dependent on the round key,
in a second run, repeating the process so as to encrypt or decrypt a further data block from the secret key (K), wherein the second permutation table selected in the second run is different from the second permutation table selected in the first run.

2. The method according to claim 1, wherein the process comprises at least one protective processing modifying a round key into a modified round key before its use in an encryption round, wherein the inverse of the function is applied to the modified round key.

3. The method according to claim 1, wherein the process comprises generating an expansion table, said generation comprising composing a predetermined expansion table with the function, and wherein an encryption round comprises:
expanding data dependent on the data block by means of the generated expansion table so as to produce expanded data,
calculating an exclusive disjunction of the expanded data and of one of the round keys, wherein an inverse of the function is applied to the result of said calculation of exclusive disjunction.

4. The method according to claim 3, wherein the process comprises generating at least one substitution table, said generation comprising composing an inverse of the function with a predetermined substitution table, and wherein an encryption round further comprises:
substituting the result of the calculation of exclusive disjunction by means of the generated substitution table.

5. The method according to claim 1, wherein several permutation tables are generated by means of different functions, and are used during different respective iterations.

6. The method according to claim 1, wherein:
the second permutation table is bijective,
an iteration following the iteration using the second permutation table comprises:
permuting, by means of an inverse table of the generated permutation table, the round key produced during the iteration so as to produce the data dependent on the initial data to which the rotation is applied,
after the rotation step, carrying out the second permutation step by means of the bijective permutation table so as to produce a new round key.

7. The method according to claim 6, wherein the second permutation table is configured to permute an input datum into an output datum by
applying an injective permutation table to some bits of the datum so as to produce an intermediate datum whereof the number of bits is less than the number of bits of the input datum,
concatenating the intermediate datum with the other bits of the input datum not used by the injective permutation table so as to produce the output datum.

8. The method according to claim 1, further comprising:
generating at least one shift value indicating a number of bits, the shift value being variable from one encryption or decryption to another,
and wherein at least one iteration further comprises a step of:
rotating the result of the second permutation step by the number of bits indicated by the generated shift value, so as to produce the round key.

9. The method according to claim 8, wherein several shift values are generated, the values being used during different respective iterations.

10. The method according to claim 9, wherein the shift values are generated from a same number drawn randomly.

11. The method according to claim 1, wherein a permutation table used during a permutation step is selected from several different previously-generated permutation tables.

12. The method according to claim 11, wherein the selection is random.

13. The method according to claim 11, wherein a permutation table, intended to be used during an iteration is selected as a function of a shift value used during the rotation step of the iteration, wherein the shift value is particular to the iteration.

14. The method according to claim 1, wherein the function includes a plurality of sub-functions composed with different portions of the predetermined permutation table.

15. A non-transitory computer program product comprising program code instructions which, when executed by at least one processor perform a method for symmetrical encryption or decryption of a data block from a secret key, comprising:
in a first run, running a process which encrypts or decrypts a data block from a secret key (K), wherein the process comprises:
permuting at least one portion of the secret key (K) by means of a first permutation table (PC1') so as to produce initial data,
selecting a second permutation table (PC2'), wherein the second permutation table (PC2') is generated by composing a function (F) with the predetermined permutation table (PC2), wherein the second permutation table (PC2') differs from said predetermined permutation table (PC2) as a result of said composing the function (F),
executing a plurality of iterations, wherein an iteration comprises:
rotating (102) data dependent on the initial data so as to produce shifted data,
permuting, in a second permutation step (104), the shifted data by means of the second permutation table (PC2') so as to produce a round key, wherein the second permutation table is generated by composing a function (F) with the predetermined permutation table (PC2), executing a plurality of encryption rounds (200) from the data block, wherein an encryption round (200) uses the round key, applying an inverse of said function (F) to data dependent on the round key, in a second run, repeating the process so as to encrypt or decrypt a further data block from the secret key (K), wherein the second permutation table selected in the second run is different from the second permutation table selected in the first run.

16. A device comprising:

at least one memory for storing a predetermined permutation table, at least one processor configured to execute a method, wherein the method comprises:

in a first run, running a process which encrypts or decrypts a data block from a secret key (K), wherein the process comprises:

permuting at least one portion of the secret key (K) by means of a first permutation table (PC1') so as to produce initial data, selecting a second permutation table (PC2'), wherein the second permutation table (PC2') is generated by composing a function (F) with the predetermined permutation table (PC2), wherein the second permutation table (PC2') differs from said predetermined permutation table (PC2) as a result of said composing the function (F), executing a plurality of iterations, wherein an iteration comprises:

rotating (102) data dependent on the initial data so as to produce shifted data, permuting, in a second permutation step (104), the shifted data by means of the second permutation table (PC2') so as to produce a round key, wherein the second permutation table is generated by composing a function (F) with the predetermined permutation table (PC2), executing a plurality of encryption rounds (200) from the data block, wherein an encryption round (200) uses the round key, applying an inverse of said function (F) to data dependent on the round key, in a second run, repeating the process so as to encrypt or decrypt a further data block from the secret key (K), wherein the second permutation table selected in the second run is different from the second permutation table selected in the first run.

\* \* \* \* \*